US006796132B1

(12) United States Patent
Hille et al.

(10) Patent No.: US 6,796,132 B1
(45) Date of Patent: Sep. 28, 2004

(54) METHOD AND APPARATUS FOR REFRESHING AIR IN A BUSTOP AIR CONDITIONER

(75) Inventors: Andreas Hille, Renningen (DE); Robert C. Reimann, LaFayette, NY (US); Belin Czechowicz, Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/429,455

(22) Filed: May 5, 2003

(51) Int. Cl.[7] .................................................. B60H 1/32

(52) U.S. Cl. ........................ 62/89; 62/427; 62/DIG. 16; 62/244; 454/139

(58) Field of Search ........................... 62/244, 410, 411, 62/427, DIG. 16, 89; 165/248–252; 454/139

(56) References Cited

U.S. PATENT DOCUMENTS

| 4,607,497 | A | * | 8/1986 | Ferdows et al. ............... 62/179 |
| 5,619,862 | A | * | 4/1997 | Ruger et al. .................. 62/409 |
| 6,282,912 | B1 | * | 9/2001 | Mannerheim ................. 62/244 |
| 6,415,620 | B1 | * | 7/2002 | Ferdows ....................... 62/244 |

* cited by examiner

Primary Examiner—William E. Tapolcai
(74) Attorney, Agent, or Firm—Wall Marjama & Bilinski LLP

(57) ABSTRACT

A bustop air conditioning module is provided with an evaporator section having a return air opening and a condenser section having a fresh air opening. A mixer opening is provided between the fresh air opening and the evaporator coil, and a flap is selectively positionable to cover or uncover the mixer opening to allow a selective amount of fresh air to be passed to the evaporator coil. Simultaneously, the flap also to selectively block a portion of the return air flowing to the evaporator coil and at the same allow a portion of the return air to be exhausted from the system.

18 Claims, 7 Drawing Sheets

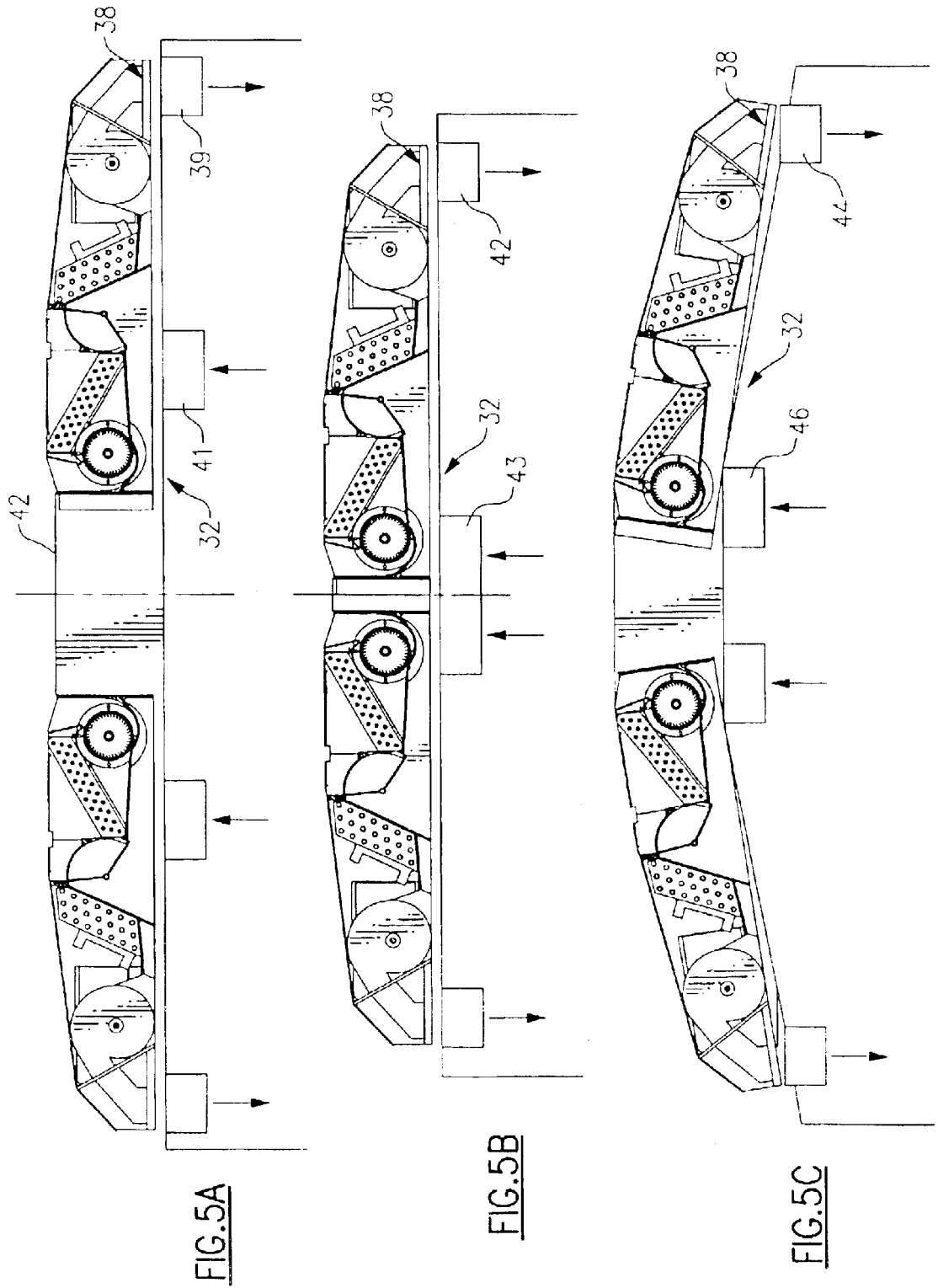

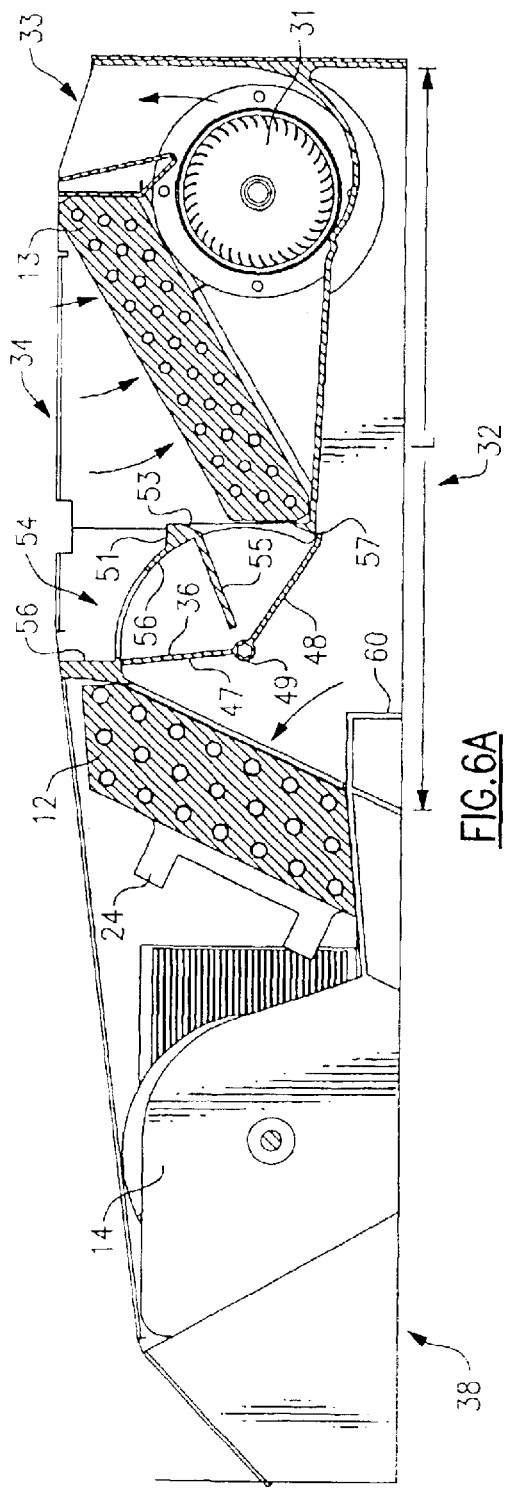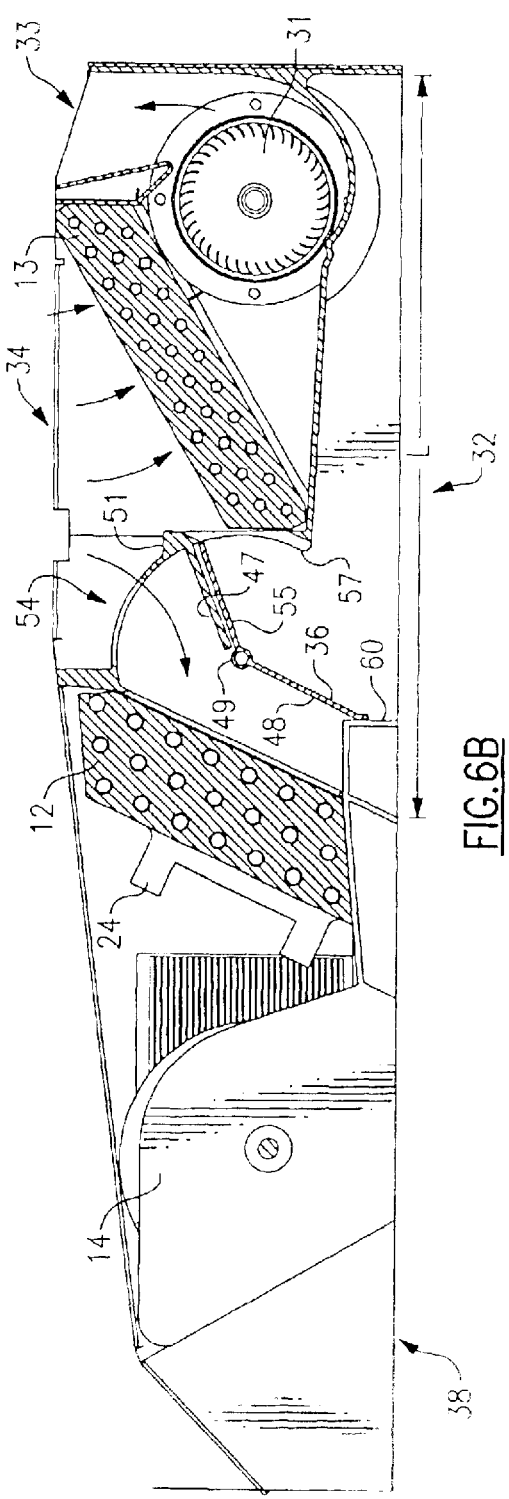

METHOD AND APPARATUS FOR REFRESHING AIR IN A BUSTOP AIR CONDITIONER

CROSS REFERENCE TO RELATED APPLICATIONS

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

BACKGROUND OF THE INVENTION

This invention relates generally to air conditioning systems and, more particularly, to an air conditioning system for the rooftop of a bus.

The most common approach for air conditioning a bus is to locate the air conditioning components on the rooftop thereof. Inasmuch as power is available from the engine that drives the bus, it has become common practice to locate the air conditioning compressor near the drive engine such that the drive engine is drivingly connected to the compressor, with the compressor then being fluidly interconnected to the air conditioning system on a rooftop of a bus. This, of course, requires rather extensive piping between the engine compartment and the air conditioning unit, thereby increasing installation and maintenance costs.

Another problem with such existing systems is that the speed that the compressor is driven is dependent on the speed in which the drive engine is running. Thus, when the drive engine is idling in a parking lot, for example, the compressor is running at a relatively slow speed which may not be sufficient to provide the desired degree of air conditioning. It is therefore generally necessary to oversize the compressor in order to obtain the performance needed under these conditions.

Others problems associated with such a motor driven compressor system is that the open drive compressor needs a shaft seal and a mechanical clutch, both of which are subject to maintenance problems. Further, since DC power is available on a bus, DC motors have been used for the air conditioning system. In general, DC motors are not as reliable as AC motors since they have brushes that wear out, and brushless motors are relatively expensive.

In addition to the problems discussed hereinabove, it is recognized, that because the wide variety of bus types and application requirements, it has been necessary to provide many different types and variations of air conditioning systems in order to meet these different requirements and vehicle interfaces. As a result, the manufacturing and installation costs, and sustaining engineering resources that are necessary in order to properly maintain and service these units, are relatively high.

Conventionally, bus air conditioning systems have relied on the general leakiness of a bus for purposes of replenishing the air therein. That is, because buses generally have many areas where outside air can leak into the bus and inside air can leak out of the bus, there has been no need to deliberately circulate fresh air into the bus and stale return air out of the bus. However, as buses have become tighter in construction, it has been found that the recirculated air can eventually become stale.

It is therefore an object of the present invention to provide an improved bus top air conditioning system.

Another object of the present invention is the provision for a bus air conditioning system which is effective at all operating speeds of the bus, while at the same time does not require an oversized compressor.

Yet another object of the present invention is the provision for reducing the manufacturing, installation, and maintenance costs of a bus air conditioning system.

Still another object of the present invention is the provision in a rooftop air conditioner for a systemic replenishment of air within the bus.

Yet another object of the present invention is the provision for a bus rooftop air conditioning system which is economical to manufacture and effective in use.

These objects and other features and advantages become more readily apparent upon reference to the following descriptions when taken in conjunction with the appended drawings.

SUMMARY OF THE INVENTION

Briefly, in accordance with one aspect of the invention, an air conditioning module is assembled with its condenser coil, evaporator coil and respective blowers located within the module and so situated that a standard module can accommodate various installation interfaces with different types and locations of return air and supply air ducts on a bus.

In accordance with another aspect of the invention, a plurality of modules can be installed on the roof of a bus, with each pair, being in back-to-back relationship near the longitudinal center line of the bus.

By yet another aspect of the invention, the modules may include a compressor, such that all the necessary refrigerant piping is located entirely on the module, with electrical power being provided to the electrical components on the module from a motor driven generator.

By still another aspect of the invention, an air mixing flap is adjustably positioned between the condenser coil and evaporator coil such that fresh air can be introduced into the flow to the evaporator coil, while at the same time, a portion of the return air is routed to the condenser discharge opening by way of the flap.

In the drawings as hereinafter described, a preferred embodiment is depicted; however various other modifications and alternate constructions can be made thereto without departing from the true sprit and scope of the invention.

BRIEF DESCRIPTION OF THE DRAWINGS

FIGS. 5A–5C are sectional views of modules as applied to various types of bus installations in accordance with a preferred embodiment of the invention.

FIGS. 6A–6C are sectional views of a module with an air mixing flaps in various positions.

DESCRIPTION OF THE PREFERRED EMBODIMENT

Figure 1:
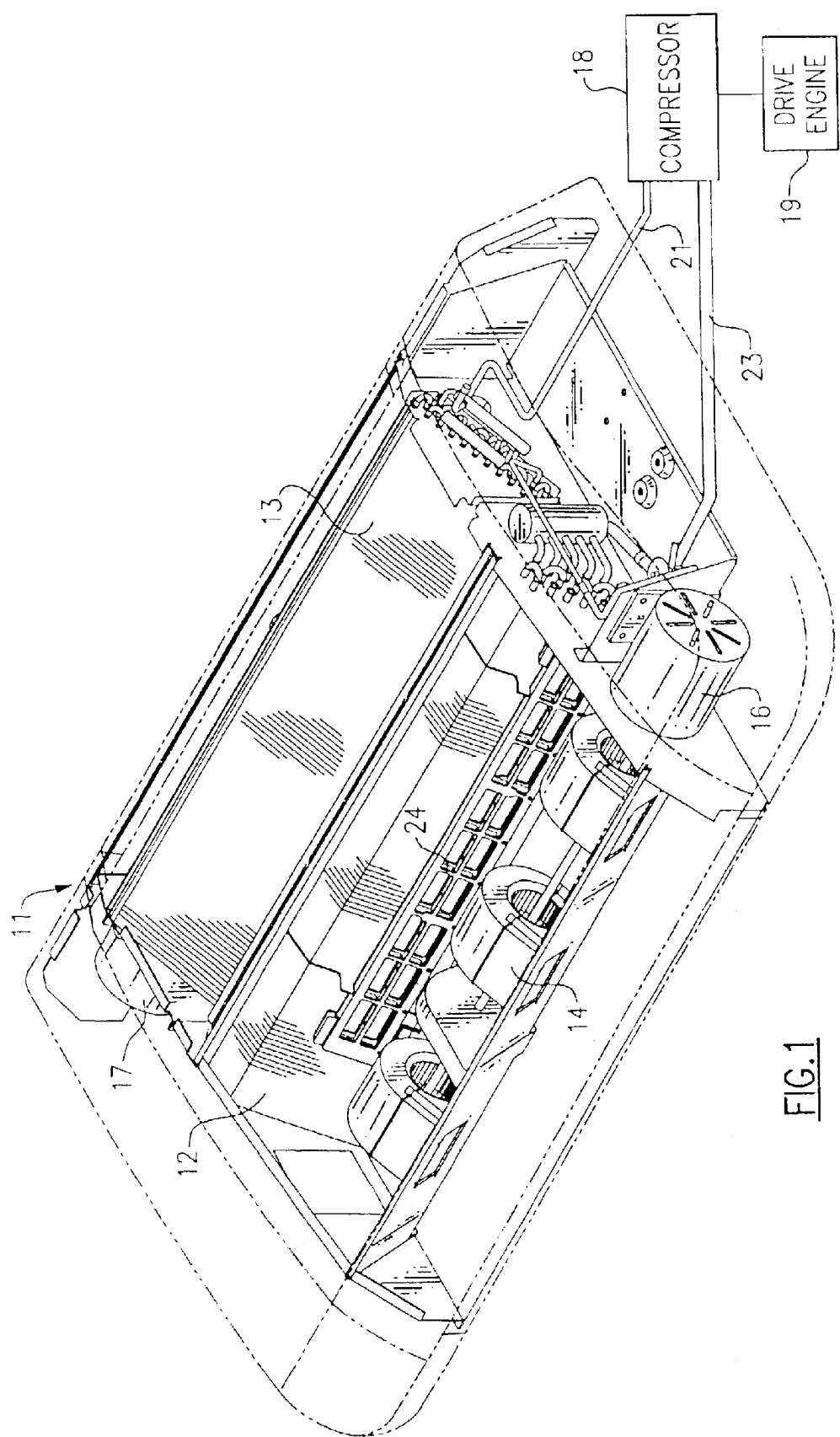
FIG. 1 is a perspective view of a module in accordance with a preferred embodiment of the invention.

FIG. 1 shows a module 11 with the cover removed to show the various components including an evaporator coil 12, a condenser coil 13, an evaporator blower 14 and drive motor 16, and a condenser fan motor 17 for driving a condenser fan.

Outside the module 11 is a compressor 18 which is driven by a motor drive 19 to pump refrigerant from the compressor 18 through refrigerant line 21 to the condenser coil 13 and eventually to the evaporator coil 12 by way of an expansion valve 22 (not shown). The refrigerant vapor then passes back to the compressor 18 by way of refrigerant line 23.

Also shown in FIG. 1 is an electrical resistance heater 24 which is downstream of the evaporator coil 12 such that, for periods of heating, the air is drawn by the evaporator blower 14 through the evaporator coil 12 and the heater 24 such that the air being delivered to the passenger compartment of the bus is heated. The electrical power to the heater 24, as well as to the evaporator blower motor 16 and the condenser fan motor 17, are provided by way of an electrical line receiving electric power from a generator or the like, which in turn is driven by the drive motor 19. The heater 24 can be powered by either DC or AC currents with the heat output being independent of the speed of the drive engine.

Figure 2:
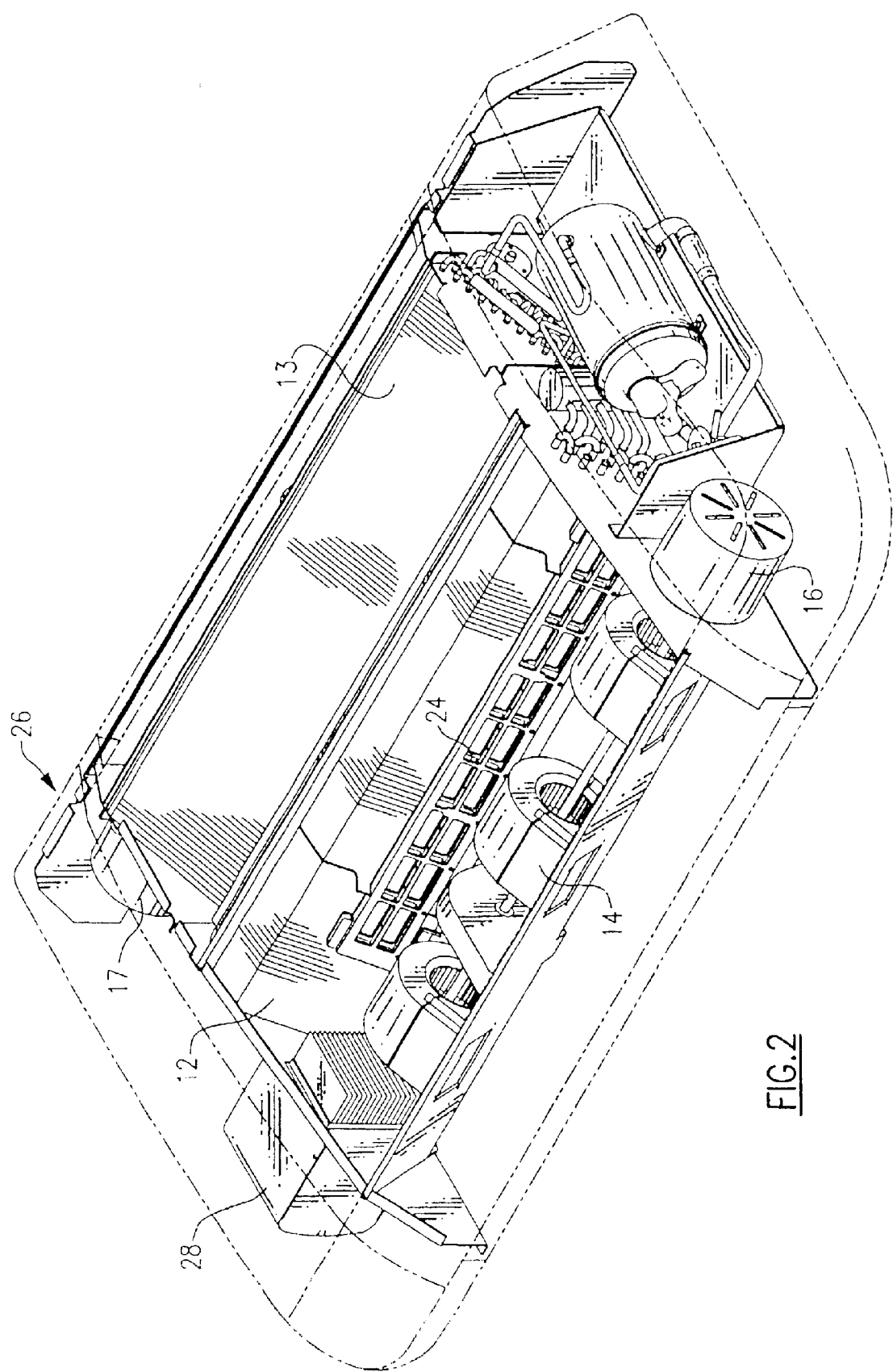
FIG. 2 is an alternative embodiment of the invention to include a compressor.
Figure 3:
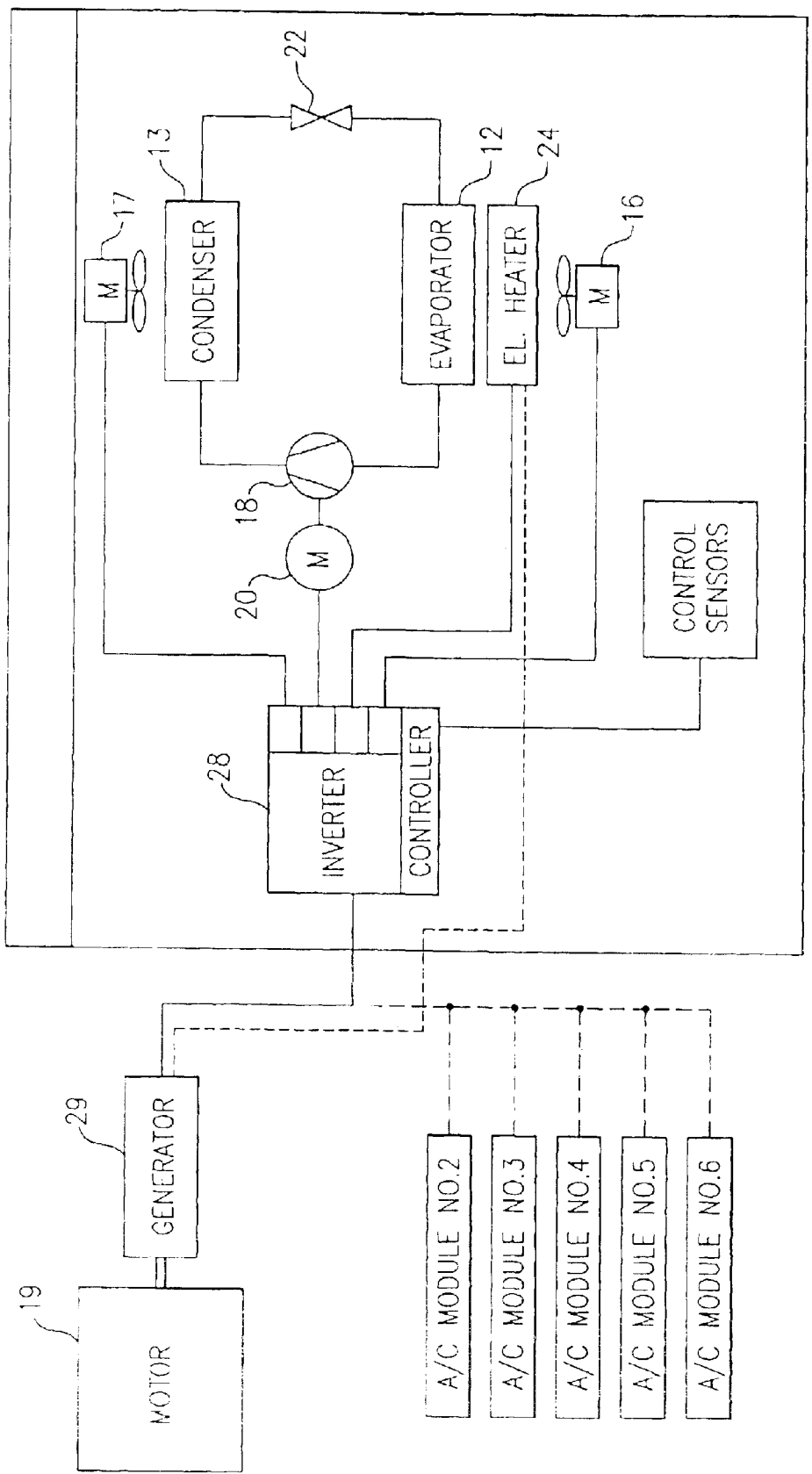
FIG. 3 is a schematic illustration of both a refrigeration circuit and an electrical circuit within a module in accordance with the present invention.

Referring now to FIG. 2, a modified module 26 is shown to include all of the components as described hereinabove. Further, it includes a horizontal rotary compressor 27 which is operatively interconnected between the evaporator coil 12 and the condenser coil 13 so as to circulate refrigerant in a manner similar as described hereinabove. The difference over the earlier described system, however, is that the compressor 18 is driven by an electric motor 20, with the power being provided by way of the generator 29, driven by the main engine 19, and an invertor/controller 28 as shown in FIG. 3. The invertor/controller 28, which includes a rectifier and an invertor, receives AC power from a generator or alternator 29 and provides, by way of the invertor, controlled AC power to the evaporator blower motor 16, the condenser blower motor 17, the compressor drive motor 20 and the heater 24 or alternatively, the heater may be powered by the generator shown by the dotted line of FIG. 3. Since the invertor/controller 28 is capable of providing controlled AC power, each of the motors are AC motors, thereby ensuring a more maintenance free system.

With the inverter/controller providing controlled AC power, a preferred type of heat 24 is a positive temperature coefficient (PIC) heater wherein electrical resistance increases relatively fast as the temperature increases. Whereas this type of heater is relatively expensive in it initial installation, it acts as a self limiter and does not require a thermostat to maintain a safe temperature limit.

Figure 4:
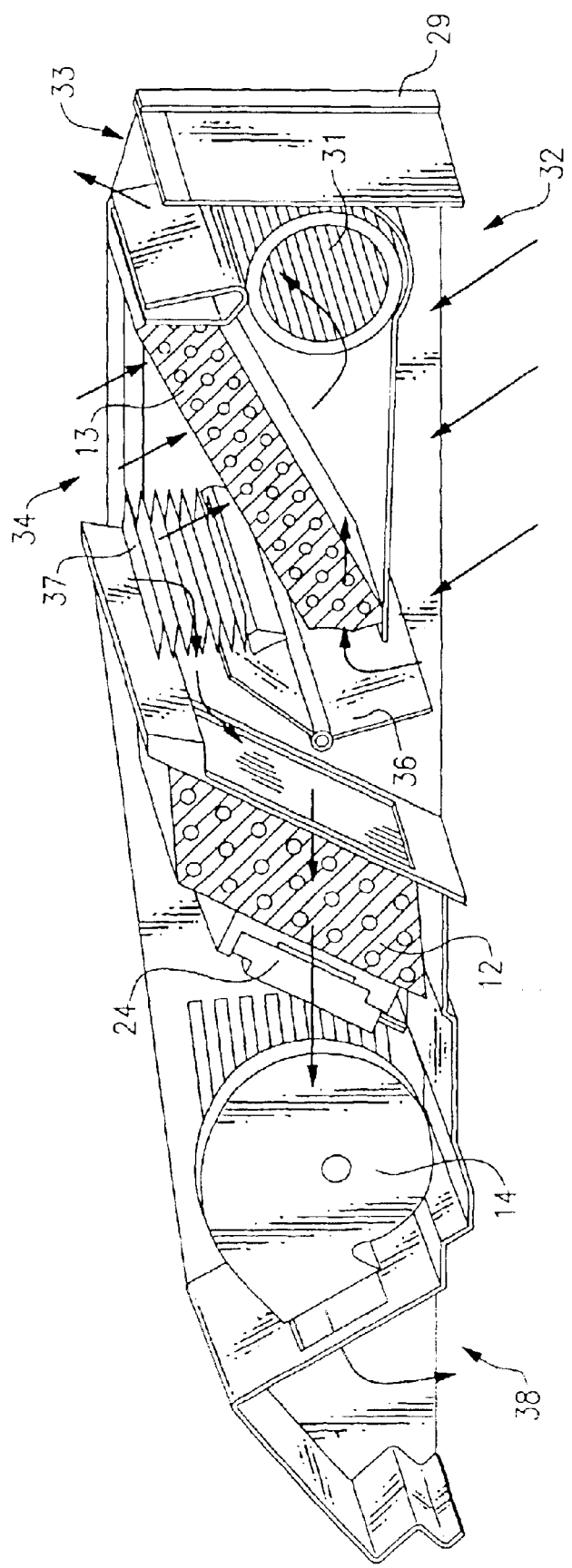
FIG. 4 is a cut away perspective view of a module in accordance with a preferred embodiment of the invention.

Referring now to FIG. 4, the module is shown with the various components as described hereinabove enclosed within a housing 29 and including a condenser fan 31. Also shown are the various openings in the housing 29, including a return air opening 32, a condenser outlet opening 33 and a condenser/fresh air intake opening 34. A fresh/return/exhaust air flap 36 is provided between the condenser coil 13 and the evaporator coil 12 to control the mix of air passing to the evaporator coil 12, depending on the particular demands of the system, as well as the existing ambient conditions. The air flow pattern, as indicated by the arrows, is thus controlled by the condenser fan 31, the evaporator fan 14 and the position of the air flap 36. As the return air enters the return air opening 32, it is caused to flow out the condenser outlet air opening and/or through the evaporator coil 12 depending on the position of the air flap 36. Similarly, the fresh air coming in the intake opening 34 passes through the condenser coil 13 and then out the condenser outlet air opening 33 and/or, depending on the position of the air flap 36, it is allowed to pass through the evaporator coil 12. Thus, with the use of the air flap 36 it is possible to have all of the return air pass through the condenser air outlet opening 33, with all fresh air passing into the air intake opening 34 and then through the evaporator coil 12, or when the flap 36 is placed in the other extreme position, all of the return air passes through the evaporator coil 12 and all of the fresh air entering the air intake opening 34 passes through the condenser coil 13 and out the condenser outlet air opening 33. A more likely operating condition, however, is an intermediate position of the air flap 36 wherein a selective mix of return air and fresh air are passed through the evaporator coil 12.

As will be seen, a filter 37 is positioned in the air flow stream which enters the fresh air intake opening 34 and passes through the evaporator coil 12. Its purposes is to filter out any debris that may be in the air stream entering the air intake opening 34. After passing through the evaporator coil 12, the conditioned air is caused to flow by the evaporator blower 14 out a supply air opening 38 as shown.

Considering now the manner in which the module 11 is positioned on the rooftop in such a way as to interface with the existing air path openings on the rooftop, reference is made to FIGS. 5a–5c. As will be seen, the position of the various openings on a bus can vary substantially from application to application. For example, in a wide bus application as shown in FIG. 5a, the supply air duct 39 is located near the outer side of the bus, whereas the return air duct 41 is disposed at a substantial distance from the longitudinal center line thereof. In a narrow bus application as shown in FIG. 5b, the supply air duct 42 is moved a small distance inwardly from the outer side of the bus, and the return air duct is located adjacent the longitudinal centerline as shown. In a curved-roof bus as shown in FIG. 5c, the supply air duct 44 is moved slightly more inwardly from the outer side of the bus, and the return air duct 46 is located in an intermediate position, somewhat outwardly of the longitudinal centerline, but not as far as for a wide bus application.

Of course, in all of the bus applications, a balanced arrangement is provided wherein each side of the bus is provided with both a supply air duct and a return air duct, in a substantially mirror image arrangement as shown. Thus, the modules may be placed in back-to-back relationship, with the space therebetween being varied to accommodate the individual application requirements. For example, for the wide bus application of FIG. 5a, there is a substantial space between the two modules wherein for the narrow bus application of FIG. 5b, they are substantially in an abutting relationship. For the curved roof bus application, they are somewhat angled from a true horizontal position, with the spacing therebetween being at an intermediate degree as shown. It should be understood that the three types of installations shown are presented as a sampling of the possible installation requirements, and there are also others that have heretofore required unique designs in order to meet the particular requirements. The present design, on the other hand, provides a single module which will meet the needs of all of the various applications of rooftop air conditioners.

As will be seen, the supply air opening is relatively small, and in each of the three cases described above, the module 11 is placed in such a position that the supply air opening 38 is located substantially over the individual supply air ducts 39, 42 and 44. The return air opening 32, on the other hand is relatively large and therefore can accommodate the various positions of the return air ducts 41, 43 and 46 as shown.

Figure 6C:
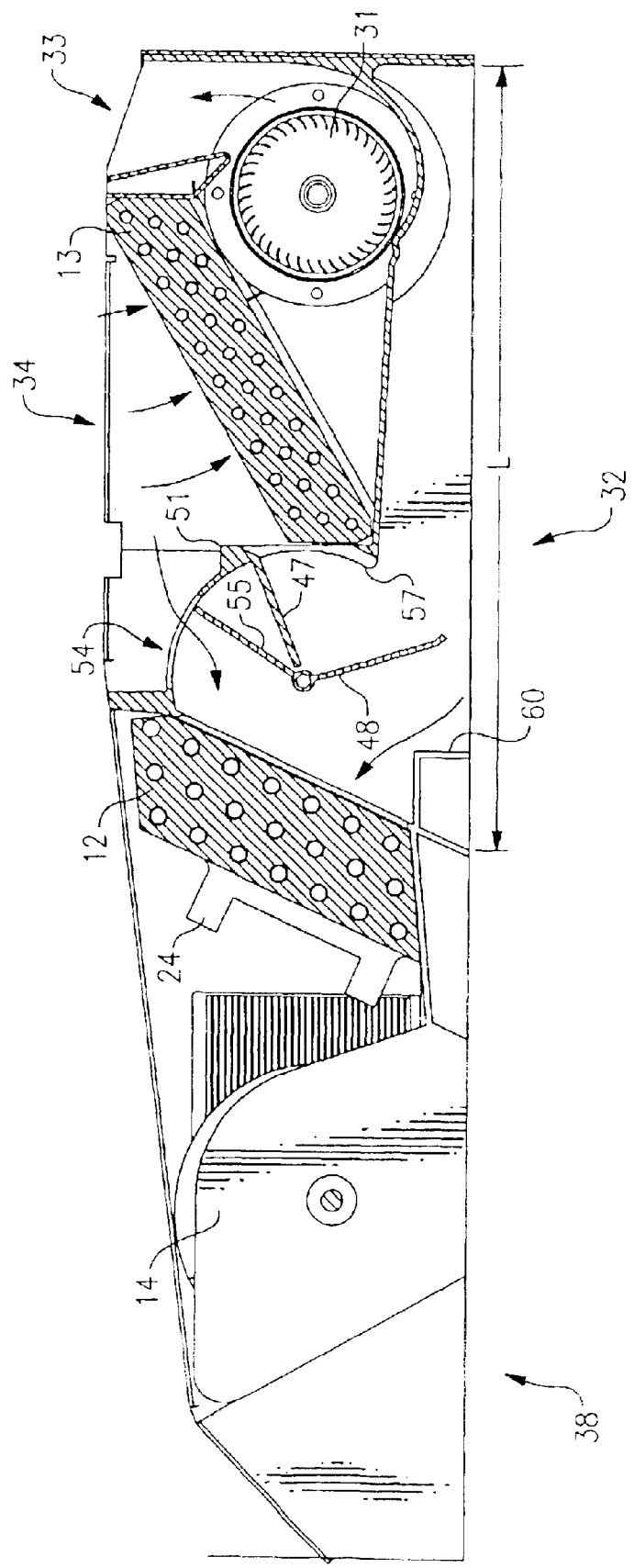

Considering the now the need to refresh the air in the air conditioner system by bringing in fresh air from the outside, the various positions of the fresh air/exhaust air flap 36 are shown in FIGS. 6a–6c. The flap 36 is made up of blades 47 and 48 integrally attached to a pivot point 49, with the angular orientation therebetween, θ, being about 135°. A related structure is a divider 51 with curvilinear portion 52 protrusion portion 53, which is mounted at its end and extends transversely across (i.e., into the drawing) the opening 54 between the evaporator coil 12 and condenser coil 13 and a baffle portion 55.

In FIG. 6a, the flap 36 is placed in such a position that its blade 47 engages the evaporator coil support structure 56, while its blade 48 engages the condenser coil support structure 57. In this position, the opening 54 is closed such that no fresh air can flow from the fresh air inlet 34 into the evaporator coil 12. Thus, all of the return air coming into the return air opening 32 passes through the evaporator coil 12 as shown, and all of the fresh air entering the fresh air intake opening 34 passes through the condenser coil 13 and out the outlet air opening 33.

In FIG. 6b, the flap 36 is rotated clockwise until the blade 47 engages protrusion portion 53 and the blade 48 engages the evaporator coil bottom support 60. In this position, the flap 36 completely blocks off the flow of return air to the evaporator coil 12, and at the same time, the opening 54 is completely opened such that some of the fresh air passing into the fresh air intake opening 34 passes through the opening 54 and through the evaporator coil 12.

In FIG. 6c, the flap 36 is placed in an intermediate position wherein the blade 47 is between the structure 56 and the curvilinear portion 52 and the blade 48 is suspended downwardly and not engaging any surface. In this position, the upper part of the opening 54, between the structure 56 and the blade 47, is open to the flow of fresh air from the fresh air opening 34, through the opening 54 and to the evaporator 12. At the same time, there is an open area to the left of the blade 48 wherein the return air may also flow through the evaporator coil 12. However, the blade 48 does offer some blockage to the flow of the return air and it also acts to divert its flow to the right, between the divider 51 and the condenser coil 13. This air then passes through the coil 13 and is caused by the fan 31 to exhaust through the opening 33. In this way, as the return air becomes stale, some of it may be exhausted out of the system and replaced with fresh air.

Of course, it will be understood that the flap 36 can be placed in any other desirable position between those described hereinabove so as to obtain the desired mixture of fresh air with the return air.

It is the intermediate positions of the flap 36 wherein the divider 51 comes into play. For example in the FIG. 6c position, the divider 51 forms a boundary between the flow of fresh air coming into the opening 54 and the return air being exhausted through the opening between the divider and the condenser coil 13. The protrusion 53 assists in preventing the exhaust air from being drawn into the flow of fresh air passing through the evaporator coil 12.

While the present invention has been particularly shown and described with reference to a preferred mode as illustrated in the drawings, it will be understood by one skilled in that various changes and detail may be effected therein without departing from the true sprit and scope of the invention as defined by the claims.

We claim:

1. A bustop air conditioner module comprising:
   an evaporator section having an evaporator coil and an evaporator fan for causing return air to flow from a return air inlet, through said evaporator coil and out a supply air opening;
   a condenser section having a condenser coil and an condenser fan for causing fresh air to flow from a fresh air inlet opening, through said condenser coil and out a condenser outlet opening; and
   a mixing flap disposed between said evaporator coil and said condenser coil, said flap being adjustably positioned to allow a selective amount of fresh air to flow from said fresh air inlet, through said evaporator coil and out said supply air opening.

2. A bustop air conditioning module as set forth in claim 1 wherein said mixing flap simultaneously varies the amount of return air passing to the evaporator coil.

3. A bustop air conditioning module as set forth in claim 2 wherein said mixing flap is so positionable that the amount of return air passing to said evaporator coil is inversely proportional to the amount of fresh air passing to said evaporator coil.

4. A bustop air conditioning module as set forth in claim 1 wherein said mixing flap is capable of being moved to a closed position wherein only return air passes through said evaporator coil and no fresh air is passed therethrough.

5. A bustop air conditioning module as set forth in claim 1 wherein said mixing flap is positionable to a fully open position wherein only fresh air passes through the evaporator coil and no return air passes therethrough.

6. A bustop air conditioning module as set forth in claim 1 wherein said mixing flap is capable of being positioned in an intermediate position wherein both return air and fresh air are caused to flow to said evaporator coil.

7. A bustop air conditioning module as set forth in claim 6 wherein said intermediate position provides for the further flow of some return air to be exhausted from the system.

8. A bustop air conditioning modules as set forth in claim 1 wherein said mixing flap comprises a pair of integrally spaced blades interconnected at their ends by a pivot.

9. A bustop air conditioning module as set forth in claim 8 and including a divider structure which interfaces with one end of a blade when the mixing flap is in an intermediate position.

10. A bustop air conditioning module as set forth in claim 9 wherein said divider includes a protrusion for acting as a flow separator when the mixing flap is in an intermediate position.

11. A method of refreshing the air in a bustop air conditioning system comprising the steps of:
  providing an evaporator section having an evaporator coil and an evaporator fan for causing return air to flow from the return air inlet, through said evaporator coil and out the supply air opening;
  providing a condenser section having a condenser coil and a condenser fan for causing fresh air to flow from the fresh air inlet opening, through said condenser coil and out a condenser outlet opening;
  providing a mixer opening between said evaporator coil and said condenser coil;
  providing a flap to selectively cover or uncover said mixer opening to selectively vary the amount of fresh air that passes through said mixer opening.

12. A method as set forth in claim 11 and including the further step of having a portion of said flap in the flow stream of return air passing to said evaporator coil such that said flap may simultaneously block a portion of the return air flowing to said evaporator coil.

13. A method as set forth in claim 12 wherein said flap simultaneously diverts a portion of return air to exhaust from the system.

14. A method as set forth in claim 11 and including the further step of adjustably moving said flap to a fully closed position wherein only return air passes through said evaporator coil and no fresh air passes therethrough.

15. A method as set forth in claim 11 and including the further step of moving said flap to a fully opened position wherein only fresh air passes through said evaporator coil and no return air passes therethrough.

16. A method as set forth in claim 11 and including the further step of adjustably positioning said flap to an intermediate position wherein both fresh air and return air pass through the evaporator coil.

17. A method as set forth in claim 16 and including the further step of simultaneously exhausting a portion of the return air flow from the system.

18. A method as set forth in claim 11 and including the further step of providing a divider within said mixer opening such that, when said flap is placed in an intermediate position, said divider acts as a flow divider between the incoming fresh air and the outgoing return air.

* * * * *